United States Patent
Seong et al.

(10) Patent No.: US 8,806,171 B2
(45) Date of Patent: Aug. 12, 2014

(54) SYSTEMS AND METHODS PROVIDING WEAR LEVELING USING DYNAMIC RANDOMIZATION FOR NON-VOLATILE MEMORY

(75) Inventors: Nak Hee Seong, Dunwoody, GA (US); Dong Hyuk Woo, San Jose, CA (US); Hsien-Hsin S Lee, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 189 days.

(21) Appl. No.: 13/480,413

(22) Filed: May 24, 2012

(65) Prior Publication Data
US 2012/0324141 A1 Dec. 20, 2012

Related U.S. Application Data

(60) Provisional application No. 61/489,348, filed on May 24, 2011.

(51) Int. Cl.
*G06F 12/02* (2006.01)
*G06F 12/14* (2006.01)
*G06F 21/55* (2013.01)

(52) U.S. Cl.
CPC .......... *G06F 12/0238* (2013.01); *G06F 21/554* (2013.01); *G06F 12/1408* (2013.01); *G06F 2212/2024* (2013.01); *G06F 2212/7211* (2013.01)
USPC .......................................... 711/202; 711/103

(58) Field of Classification Search
CPC . G06F 21/554; G06F 21/567; G06F 12/0238; G06F 12/1408
USPC .................................................. 711/103, 202
See application file for complete search history.

(56) References Cited

U.S. PATENT DOCUMENTS

| 7,350,085 | B2 * | 3/2008 | Johnson et al. ............... 713/193 |
| 7,830,706 | B2 | 11/2010 | Hanzawa et al. |
| 7,876,616 | B2 | 1/2011 | Reid et al. |
| 2004/0083335 | A1 * | 4/2004 | Gonzalez et al. ............. 711/103 |

(Continued)

OTHER PUBLICATIONS

Qureshi, Moinuddin K. et al., "Practical and Secure PCM Systems via Online Attack Detection", https://researcher.ibm.com/researcher/files/us-moinqureshi/papers-hcpa11.pdf, Publication date not available. Online access as recent as Apr. 22, 2011, pp. 1-12.
Qureshi, Moinuddin K. et al., "Scalable High Performance Main Memory System Using Phase-Change Memory Technology", ISCA'09, Austin, Texas, Jun. 20-24, 2009, pp. 1-10.

(Continued)

*Primary Examiner* — Hal Schnee
(74) *Attorney, Agent, or Firm* — Troutman Sanders LLP; Ryan A. Schneider; Christopher Close, Jr.

(57) ABSTRACT

Systems and methods for dynamically remapping elements of a set to another set based on random keys. Application of said systems and methods to dynamically mapping regions of memory space of non-volatile memory, e.g., phase-change memory, can provide a wear-leveling technique. The wear leveling technique can be effective under normal execution of typical applications, and in worst-case scenarios including the presence of malicious exploits and/or compromised operating systems, wherein constantly migrating the physical location of data inside the PCM avoids information leakage and increases security; wherein random relocation of data results in the distribution of memory requests across the physical memory space increases durability; and wherein such wear leveling schemes can be implemented to provide fine-grained wear leveling without overly-burdensome hardware overhead e.g., a look-up table.

23 Claims, 10 Drawing Sheets

(56) References Cited

U.S. PATENT DOCUMENTS

| | | | |
|---|---|---|---|
| 2006/0047886 A1* | 3/2006 | Leaback | 711/5 |
| 2009/0109788 A1* | 4/2009 | Moon et al. | 365/230.03 |
| 2009/0113217 A1* | 4/2009 | Dolgunov et al. | 713/190 |
| 2010/0106920 A1* | 4/2010 | Anckaert et al. | 711/154 |
| 2010/0157641 A1 | 6/2010 | Shalvi et al. | |
| 2012/0131304 A1* | 5/2012 | Franceschini et al. | 711/202 |

OTHER PUBLICATIONS

Lee, Benjamin C. et al., "Phase Change Techonolgy and the Future of Main Memory", Micro, IEEE, vol. 30, No. 1, Jan.-Feb. 2010, pp. 1-7.

Zhang, Wangyuan et al., "Exploring Phase Change Memory and 3D Die-Stacking for Power/Thermal Friendly, Fast and Durable Memory Architectures", PACT '09 Proceedings of the 2009 18th International Conference on Parallel Architectes and Compilation Techniques, 2009, pp. 1-12.

* cited by examiner

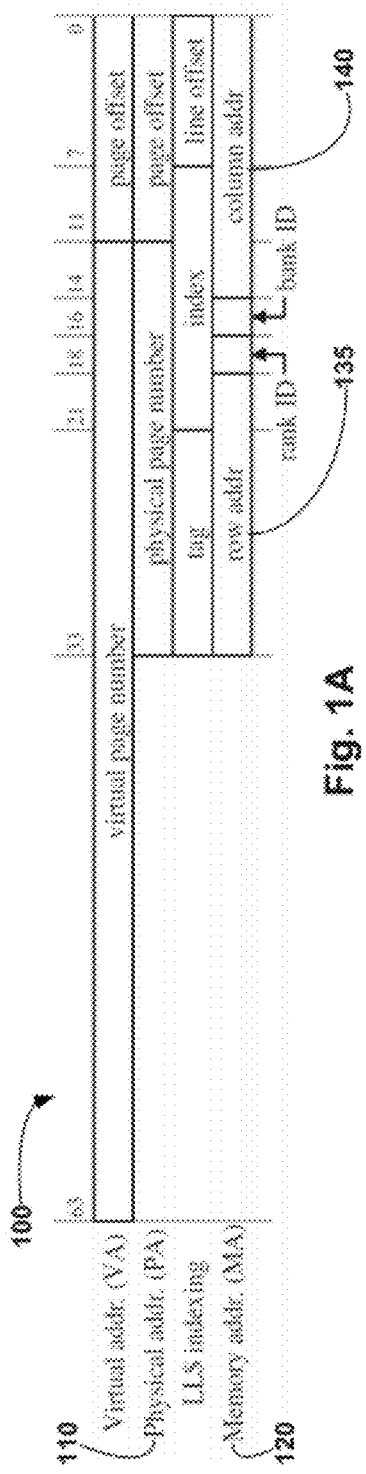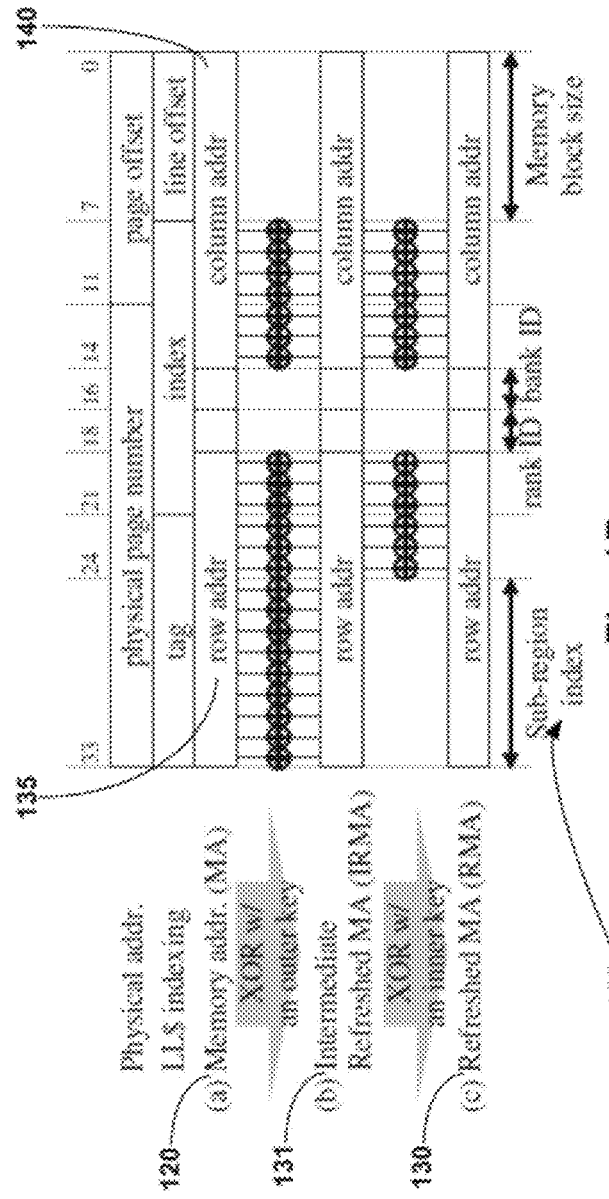
Fig. 1A
Fig. 1B

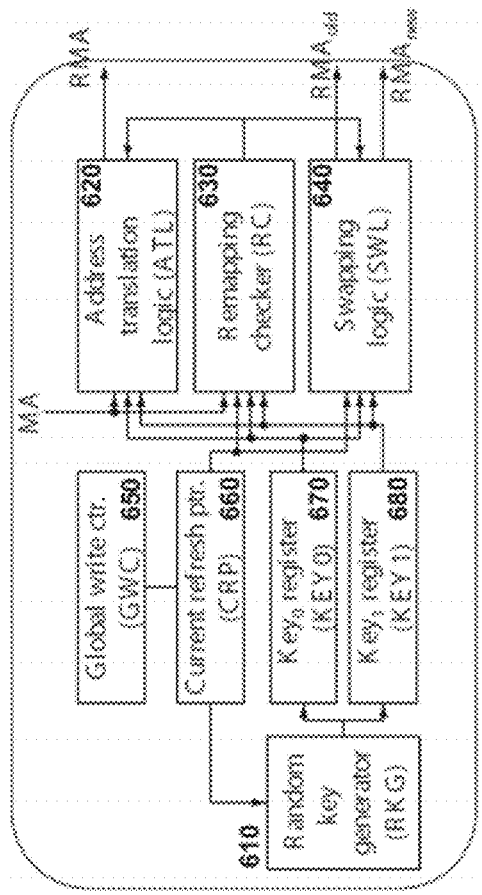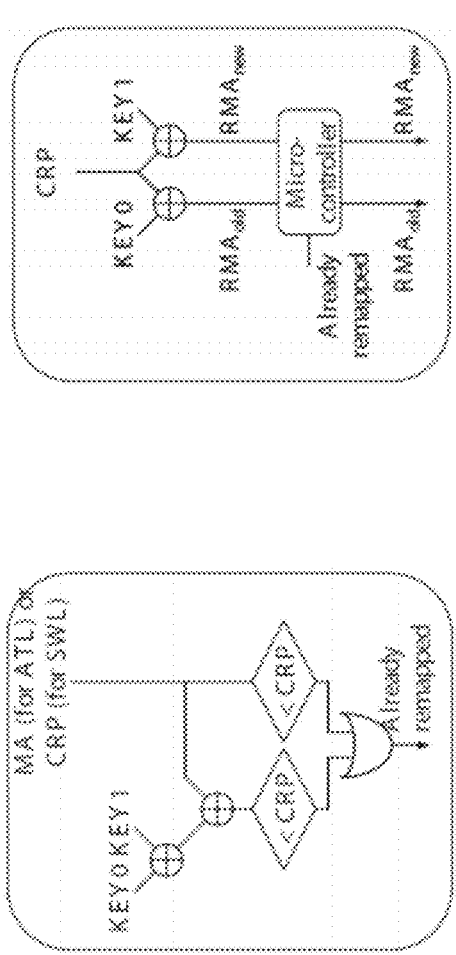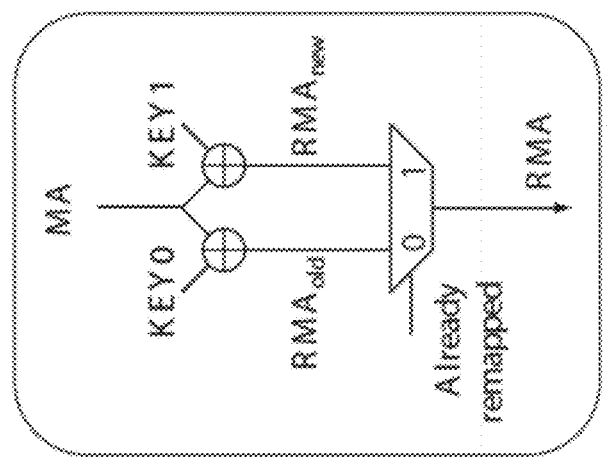

US 8,806,171 B2

SYSTEMS AND METHODS PROVIDING WEAR LEVELING USING DYNAMIC RANDOMIZATION FOR NON-VOLATILE MEMORY

CROSS REFERENCE TO RELATED APPLICATION

This application claims benefit under 35 USC §119(e) of U.S. Provisional Patent Application Ser. No. 61/489,348, filed 24 May 2011, which application is hereby incorporated fully by reference.

STATEMENT REGARDING FEDERALLY SPONSORED RESEARCH OR DEVELOPMENT

This invention was made with Government support under Agreement/Contract numbers CCF-0811738 and CNS-0644096, awarded by the National Science Foundation. The Government has certain rights in the invention.

BACKGROUND OF THE INVENTION

1. Field of the Invention

The present invention relates generally to algorithms for mapping elements between two sets and, more particularly, to algorithms for repeatedly mapping elements between two sets based on random keys so as to dynamically provide random mappings. Such dynamic mapping algorithms can be applied to memory address spaces to effect wear leveling techniques; and more particularly, wear leveling techniques for mitigating worst-case wear scenarios including malicious attacks and/or compromised operating systems.

2. Description of the Related Art

Phase change memory (PCM) has emerged as a potential memory technology for improving the performance of the overall system memory hierarchy. A PCM cell can be made of phase-change material based on chalcogenide alloys commonly composed of the elements Germanium (Ge), Antimony (Sb), and Tellurium (Te). Such materials have at least two distinct phases—a high electrical resistive amorphous phase and a low resistive crystalline phase. The crystalline phase can be reached by heating the material above the crystallization temperature while the material can be switched into the amorphous phase by melting and quickly quenching. A data bit can be stored in either state, both of which are non-volatile.

Recently, researchers have studied the trade-off of using PCM as the main memory, or even as the last level cache. The density of PCM is currently higher than that of dynamic random-access memory (DRAM) and expected to increase. Moreover, PCM promises better scalability with process technology scaling. And although the latency of PCM is currently several times higher than DRAM, several studies showed that the benefits gained from its high density can outweigh the degradation of access time by employing a deeper memory hierarchy or employing a hybrid-memory architecture with mixed usage of other memory technologies.

The primary roadblock for using PCM as part of the main memory is its much lower write endurance compared to DRAM. The current write endurance of a PCM cell is around $10^{-8}$. Several recent studies have attempted to address this issue by either reducing PCM's write frequency or using wear-leveling techniques to evenly distribute PCM writes. Although these techniques can extend the lifetime of PCM under normal operations of typical applications, most of them fail to prevent an adversary from writing malicious code deliberately designed to wear out and fail PCM. For instance, schemes to reduce write frequency, such as data comparison write (B.-D. Yang, J.-E. Lee, J.-S. Kim, J. Cho, S.-Y. Lee, and B.-G. Yu, "A Low Power Phase-Change Random Access Memory using a Data-Comparison Write Scheme," in *Proc. IEEE International Symposium on Circuit and Systems*, 2007) and Flip-N Write (S. Cho and H. Lee, "Flip-N-Write: A Simple Deterministic Technique to Improve PRAM Write Performance, Energy and Endurance," in *Proc. of the International Symposium on Microarchitecture*, 2009) do not prevent an adversary from wiggling the memory bits of the same PCM location and wearing them out. Previous wear-leveling schemes are also vulnerable due to the inherent weaknesses caused by static randomization, coarse-grained shuffling, and regular pattern shuffling.

Furthermore, prior attempts do not consider circumstances when the underlying operating system (OS) is compromised and the resulting security implications to PCM design. A compromised OS, (e.g., via buffer overflow) can allow adversaries to manipulate all processes and easily exploit side channels, accelerating the wear-out of targeted PCM blocks and rendering a dysfunctional system. For example, a compromised OS can thrash or turn off all caches, disabling a shield that protects the PCM. Moreover, if the compromised OS allows a malicious process to obtain and assemble useful information leaked from side channels (e.g., timing attacks to deduce the shuffling pattern in a wear-leveling scheme), the wear-leveling scheme will not stop adversaries from tracking, pinpointing, and wearing out target PCM blocks. Attacking a system with side channels using time, power, electromagnetic emission, architectural vulnerability, etc., have all been successfully demonstrated in many systems including the Microsoft© Xbox©. Designing PCM without careful consideration for these security implications risks computationally inaccurate results and critical data loss, potentially leading to dire financial consequences.

BRIEF SUMMARY

There remains a need in the art for PCM systems and methods that increase the durability of PCM under normal execution of typical applications, and in worst-case scenarios including the presence of malicious exploits and/or compromised operating systems. Preferably, such systems and methods implement dynamic run-time randomization on low-cost hardware embedded inside the PCM. It is to such wear-leveling systems and methods that various embodiments of the present invention are directed.

Briefly described, in an exemplary form, the present invention is a technique for dynamically remapping a first set of elements onto a second set of elements. Applied to regions of memory address space, the dynamic remapping algorithm can obfuscate the actual location of data within a region by constantly mapping data to a new address based on random keys generated at run-time. For regions of memory address space in a non-volatile memory such as phase-change memory (PCM), dynamic remapping enables a wear leveling effect by distributing memory requests across the physical memory space. Wear leveling transforms non-volatile memory with limited write endurance to a more resilient manufacture with a longer lifetime.

The present invention has unique advantages over prior wear leveling schemes: (i) wherein constantly migrating the physical location of data inside the PCM avoids information leakage, providing increased security; (ii) wherein the random relocation of data results in the distribution of memory requests across the physical memory space, providing increased durability; and (iii) wherein the wear leveling scheme can be implemented to provide fine-grained wear leveling without overly-burdensome hardware overhead, such as a look-up table.

Thus, in an exemplary embodiment, the present invention is a method for dynamically remapping a first set of elements onto a second set of elements, wherein dynamically remapping the first set onto the second set can comprise performing two or more rounds of mapping. Each round of mapping can include providing a random key and mapping each element of the first set to an element in the second set at least partially based on the random key.

The number of elements of the first set can equal the number of elements of the second set, and there can be a one-to-one relationship between the elements of the first set and second set. Pairs of elements from the first set and set can be associated with a sub-element.

The first set and the second set can have a first region of memory address space and a second region of memory address space, respectively, an element can comprise a memory block, and a sub-element can comprise data. Mapping each element of the first set to an element in the second set can occur at a predetermined interval.

The method can further include providing one or more requests for an element of the first set, and the predetermined interval can be at least partially based on a predetermined number of requests for an element of the first set.

An element in the first set can be a domain element and an element in the second set can be a range element. Mapping a domain element of the first set to a range element in the second set can include dissociating a first sub-element associated with the range element in the second set from the element in the second set, dissociating a second sub-element from a second element in the second set associated with the domain element of the first set from the second element in the second set, associating the second sub-element with the range element in the second set; and associating the first sub-element with the second element in the second set that the second sub-element is dissociated from.

A round of mapping can further include tracking the mapping of each element of the first set to an element in the second set. Tracking the mapping can include providing an indicator pointing to an element in the first set, determining if a sub-element associated with the element pointed to by the indicator has been associated in the particular round of mapping, and if the sub-element has not been associated in the particular round of mapping, mapping the element pointed to by the indicator to an element of the second set, setting the indicator to point to another element of the first set, and repeating determining and setting until it is determined that all the sub-elements of the first set have been associated in the particular round of mapping.

In another exemplary embodiment, the present invention is a method for dynamically remapping a first region memory address space having a plurality of memory blocks to a second region memory address space having a plurality of memory blocks. The size of the second region can equal the size of the first region, there can be a one-to-one relationship between memory blocks of the first region and second region, and a memory block can be associated with data. The method can comprise dynamically remapping the first region onto the second region. Dynamically remapping the first region onto the second region can involve performing two or more rounds of mapping. Each round of mapping can include generating a random key, mapping each memory block of the first region to a memory block in the second region at least partially based on the random key, and tracking the mapping of each memory block of the first region to a memory block in the second region.

The method can further include providing one or more write requests to the first region of memory address space, and mapping a memory block of the first region to a memory block in the second region can occur every predetermined number of write requests to the first region of memory address space.

Mapping at least partially based on the random key can comprise mapping based on an algebraic operation on a block address of a memory block of the first region with the random key, the algebraic operation satisfying the associative, commutative, and self-inverse properties. The algebraic operation can be an XOR operation.

Mapping a domain memory block of the first region to a range memory block in the second region can include delocating a first data associated with the range block in the second region from the block in the second region, delocating a second data from a second block in the second region associated with the domain block of the first region from the second block in the second region, relocating the second data to the range block in the second region, and relocating the first data to the second block in the second region that the second data is delocated from.

Tracking the mapping of each memory block of the first region to a memory block in the second region can include providing a pointer pointing to a memory block in the first region, determining if data associated with the memory block pointed to by the pointer has been associated in the particular round of mapping, and if the data has not been associated in the particular round of mapping, mapping the memory block pointed to by the pointer to a memory block of the second region, incrementing the pointer to point to another memory block of the first region, repeating determining and incrementing until it is determined that all the blocks of the first region have been mapped in the particular round of mapping.

In another exemplary embodiment, the present invention is a system for dynamically remapping a set of elements onto another set of elements comprising a first set of elements, a second set of elements, a random key provider, and a controller configured to dynamically remap the first set onto the second set. Dynamically remapping the first set onto the second set can involve performing two or more rounds of mapping. Each round of mapping can include mapping each element of the first set to an element in the second set at least partially based on a random key provided for each round by the random key provider.

The first set of elements and the second set of elements can comprise a first region of memory address space and a second region of memory address space, respectively, an element can comprise a memory block, and a memory block can be associated with data.

The random key provider can be a random key generator. The controller can have a register configured to store a random key and a register configured to store an additional random key. The random key generator can be part of the controller.

Each round of mapping can further include tracking the mapping of each memory block of the first region to a memory block in the second region. The controller can also have a bit register for every memory block in the first region of memory address space. Alternatively, the controller can also have a register configured to store a pointer for pointing to a memory block and a remapping checker configured to determine if a memory block in the first region has been mapped in a particular round.

The size of a memory block can be the cache line size of a last-level cache. The random key generator can generate random keys based at least partially on thermal noise from the controller.

Mapping at least partially based on the random key can include mapping at least partially based on an algebraic operation on a block address of a memory block of the first region with the random key, the algebraic operation satisfying the associative, commutative, and self-inverse properties. The controller can be associated with two swap buffers configured to hold data and can also have a swapping logic configured to swap memory blocks of the second region using at least the two swap buffers.

The system can also have one or more write requests for a memory block of the first region. The controller can also have a register to store a counter for counting the number of write requests for a memory block in the first region. The predetermined interval can be based on a predetermined number of write requests for a memory block in the first region.

The controller can also have address translation logic configured to translate the address of a given memory address to an address of a memory block in the first region based on the random key, the additional random key, and the memory block pointer.

The system can have a non-volatile memory bank, the memory bank comprising one or more controllers.

BRIEF DESCRIPTION OF THE FIGURES

FIG. 1A illustrates an addressing scheme of a baseline architecture of a main memory system, according to an exemplary embodiment of the present invention.

FIG. 1B illustrates an addressing scheme of a two-level Security Refresh, according to an exemplary embodiment of the present invention.

FIG. 7A illustrates a schematic diagram of an exemplary controller, according to an exemplary embodiment of the present invention.

FIG. 7B illustrates a schematic diagram of an address translation logic, according to an exemplary embodiment of the present invention.

FIG. 7C illustrates a schematic diagram of a remapping checker, according to an exemplary embodiment of the present invention.

FIG. 7D illustrates a schematic diagram of a swapping logic, according to an exemplary embodiment of the present invention.

DETAILED DESCRIPTION

Figure 2:
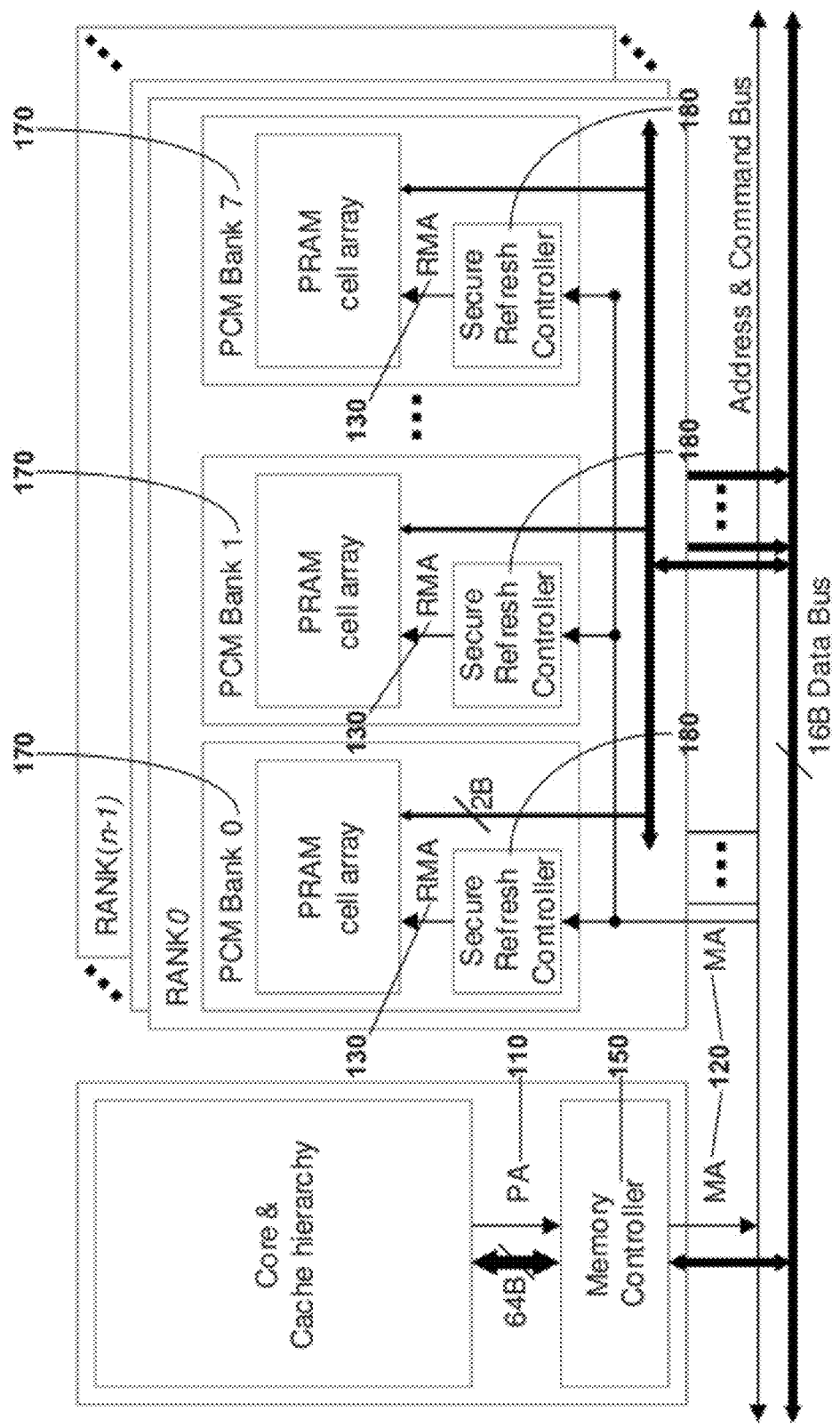
FIG. 2 illustrates a block diagram of a memory address translation path, according to an exemplary embodiment of the present invention.

To facilitate an understanding of the principles and features of the invention, various illustrative embodiments are explained below. Although many exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways.

In describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

In particular, the present invention is described in the context of being a method for dynamically remapping a memory address space to another memory address space, providing the benefits of improved security and wear leveling for phase-change memory (PCM).

Embodiments of the invention, however, are not limited in application to phase-change memory. Rather, embodiments of the invention may be used for providing improved security and wear leveling in use of various other volatile and non-volatile memory systems including hybrid-memory architectures. Moreover, the underlying dynamic remapping technique can be applied to provide increased security in various non-memory applications such as, but not limited to, encryption systems and methods.

All or a portion of the invention can be embodied in a computer program product on a computer-readable medium, executable by a computer processor of a computing device. In some embodiments, the invention can comprise a specialized computing device.

The components described hereinafter as making up various elements of the invention are intended to be illustrative and not restrictive. Many suitable components that would perform the same or similar functions as components described herein are intended to be embraced within the scope of the invention. Such other components not described herein may include, but are not limited to, for example, components developed after the invention. Those of skill in the art will appreciate that various components may serve as substitutes for the elements described herein.

Various exemplary embodiments of the present invention comprise systems and methods for dynamic remapping. Referring now to the figures, in which like reference numerals represent like parts throughout the views, various embodiments of dynamic mapping technique as applied to PCM memory will be described in detail.

FIG. 1A illustrates an addressing scheme of a baseline architecture 100 of a main memory system 432, according to an exemplary embodiment of the present invention. As shown in FIG. 1A, a memory controller 150 can map a given physical address (PA) 110 into a memory address (MA) 120 that consists of a rank ID, a bank ID, a row address 135, and a column address 140 for indexing the main memory. In the following examples, it is understood that a memory controller 150 interleaves consecutive row addresses across different banks—a common mechanism to enhance bank-level parallelism. However, it will be apparent to those skilled in the art that other configurations are possible.

Prior studies have focused on extending the lifetime of a PCM-based system that runs conventional applications but fail to protect the system against deliberately-crafted malicious attacks. Although durability and security may seem two separate issues in PCM design, they can be addressed at the same time. Exemplary PCM designs of the present invention consider worst-case wear-out scenarios including malicious attacks such as side channel exploits.

To circumvent intentional exploits, an adversary can be kept from inferring an actual physical PCM location of data. Furthermore, the address space can be shuffled dynamically over time to avoid the leakage of useful information through side-channels. To achieve these goals, the present invention can define an additional address space, the Refreshed or Remapped Memory Address 130 (RMA) space, inside a PCM bank 170 to dissociate a memory address 110 from the actual location of the associated data.

I. Security Refresh

After receiving an access command in MA 120 from a memory controller 150, a PCM bank 170 can recalculate its own internal row 135 and column address 140 in RMA. To provide such operation, the present invention enables a scheme called Security Refresh. Similar to DRAM refresh, which cycles through a DRAM bank reading each row and writing it back again to compensate for the gradual leakage of charge from the capacitors which store the data, Security Refresh can prevent address information from being leaked from PCM accesses by dynamically randomizing mapping between MAs and RMAs. From hereinafter, the term "refresh" should be understood to refer to dynamic remapping or dynamically remapping.

Rather than refreshing based on time, as with DRAM cells, an exemplary embodiment of the security refresh scheme can refresh a PCM region 190 based on usage, i.e., the number of memory write requests to the PCM region 190.

Security Refresh can be controlled by one or more Security Refresh Controllers 180 (SRCs). In addition to remapping an MA into an RMA, a SRC 180 can also periodically change the mapping between these two address spaces with low hardware overhead.

FIG. 2 illustrates a block diagram of a memory address translation path, according to an exemplary embodiment of the present invention. As shown in FIG. 2 one or more SRCs 180 can be embedded inside a PCM bank 170. Embedding an SRC 180 inside the PCM bank 170 can provide the following nonexclusive benefits: obfuscating the address information regarding the actual physical data placement from applications, a potentially compromised operating system 834 (OS), and the memory controller 150; obfuscating potential side-channel leakage; prohibiting physical tampering, e.g., memory bus probing; allowing a memory controller 150 to exploit bank-level parallelism for better scheduling; enabling high-efficiency operation without disturbing the off-chip bus during data shuffling and swapping; enabling a high-bandwidth data swapping mechanism without being constrained by potentially limited, off-chip pin bandwidth; and allowing PCM vendors to protect their products without relying on a third-party software/hardware such as the OS 834 or the memory controller 150.

Merely concealing internal memory addresses will not safeguard against calculated attacks—information leaked through side channels can allow an adversary to assemble useful knowledge and devise a side-channel attack for target PCM locations. However, the internal address mapping can be periodically updated to obfuscate any relationships among information leaked from side channels.

Figure 3:
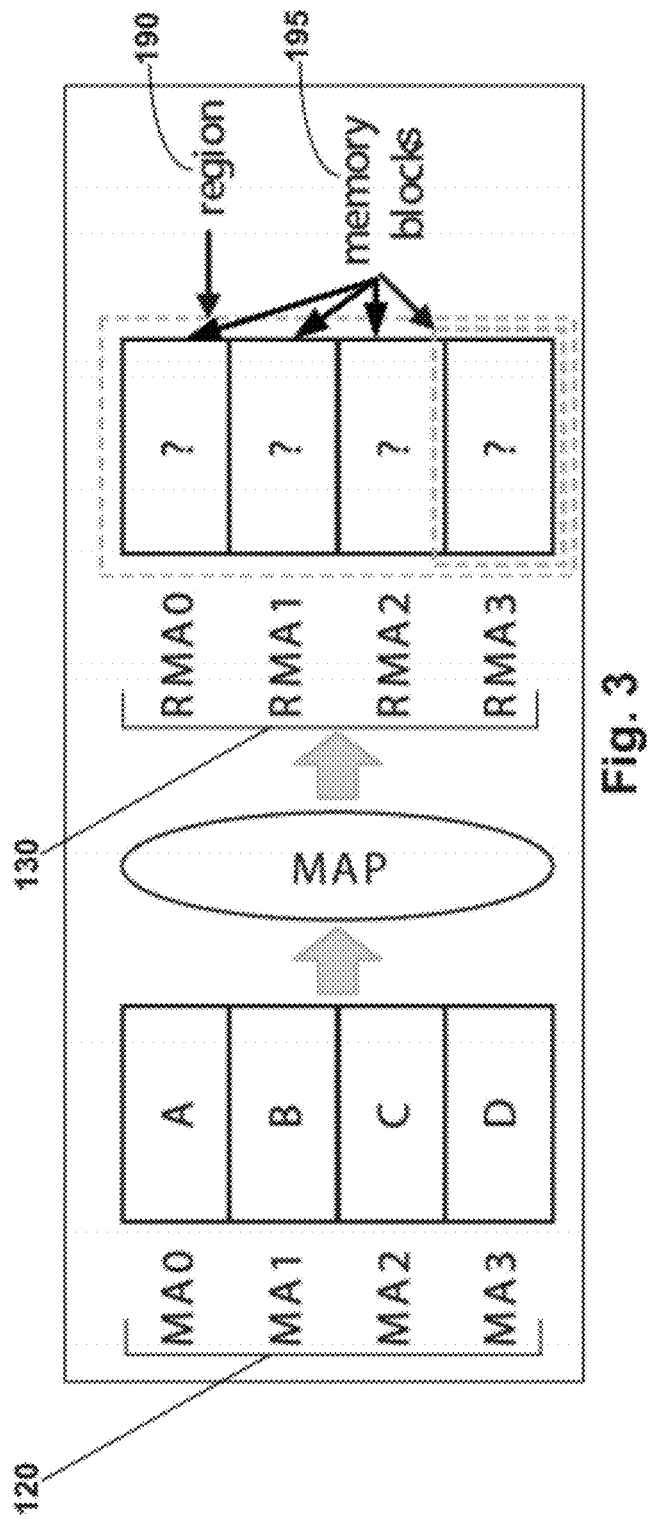
FIG. 3 illustrates a region of memory address space comprising memory blocks, according to an exemplary embodiment of the present invention.

FIG. 3 illustrates a region of memory address space 190 comprising memory blocks 195, according to an exemplary embodiment of the present invention. For simplicity, the region 190 is illustrated as containing only four memory blocks 195. However, it will be apparent to those skilled in the art that regions 190 can comprise arbitrary numbers of memory blocks 195 at a potential performance tradeoff. In some embodiments, a memory block can be no smaller than a cache line in order to simplify address look-up.

Likewise, in the following explanation of the Security Refresh algorithm, a PCM bank 170 is treated as one region 190. However, a PCM bank 170 can comprise multiple regions 190 and sub-regions of memory blocks 195 in various embodiments of the present invention.

After a predetermined number of memory write requests to a region 190 of memory address space, the SRC 180 for that region can refresh 240 a memory block 195 by potentially remapping the memory block to a new PCM location based on a randomly generated key. This number of writes can be analogous to DRAM's refresh rate and is herein referred to as the security refresh interval 250. In various embodiments, the security refresh interval can be based on memory access requests, time, any of various other factors, or a combination.

At each subsequent security refresh interval 250, the refresh operations can continue for all memory blocks 195 in each region 190. A complete iteration of refreshing every single memory block in a region 190 is herein referred to as a security refresh round 220, similar to DRAM's refresh period.

Figure 5:
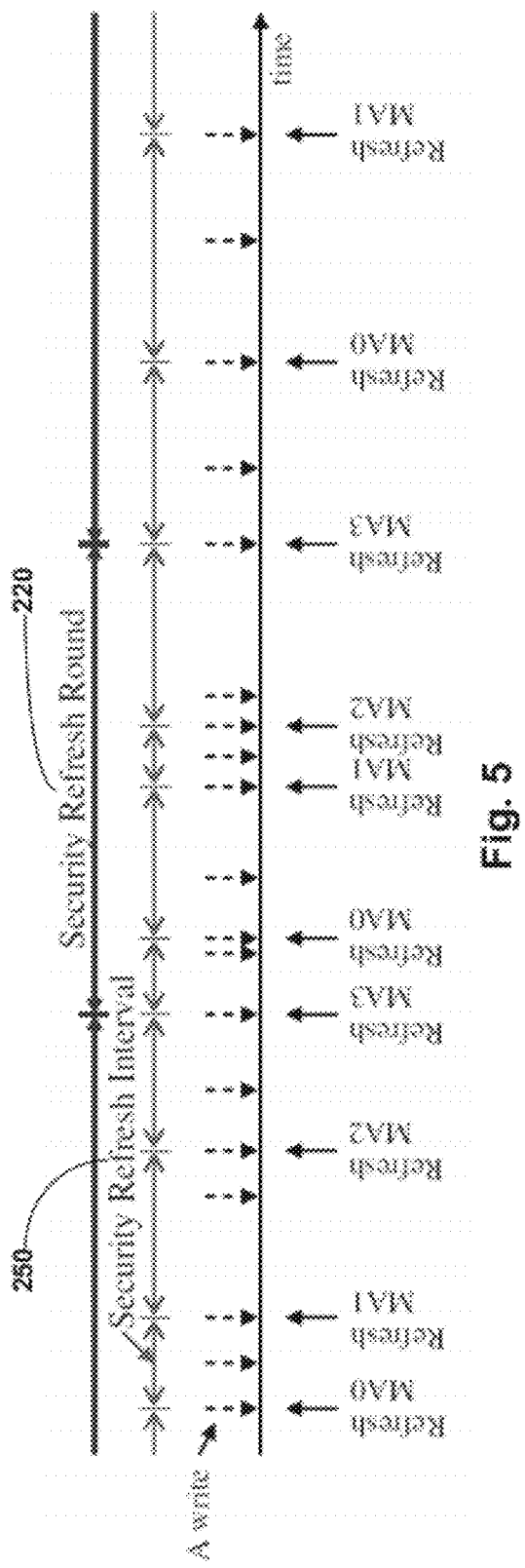
FIG. 5 illustrates a timeline diagram of security refresh rounds comprising the refresh of four memory blocks with a security refresh interval of two memory write requests, according to an exemplary embodiment of the present invention.

FIG. 5 illustrates a timeline diagram of security refresh rounds comprising the refresh of four memory blocks with a security refresh interval of two memory write requests, according to an exemplary embodiment of the present invention. As shown in FIG. 5, the exemplary security refresh round comprises a refresh of each of the four memory blocks 195 in the example region 190. In an exemplary embodiment, the SRC 180 can generate a new random key 210 to begin a new security fresh round 220.

II. Security Refresh Algorithm

Figure 6:
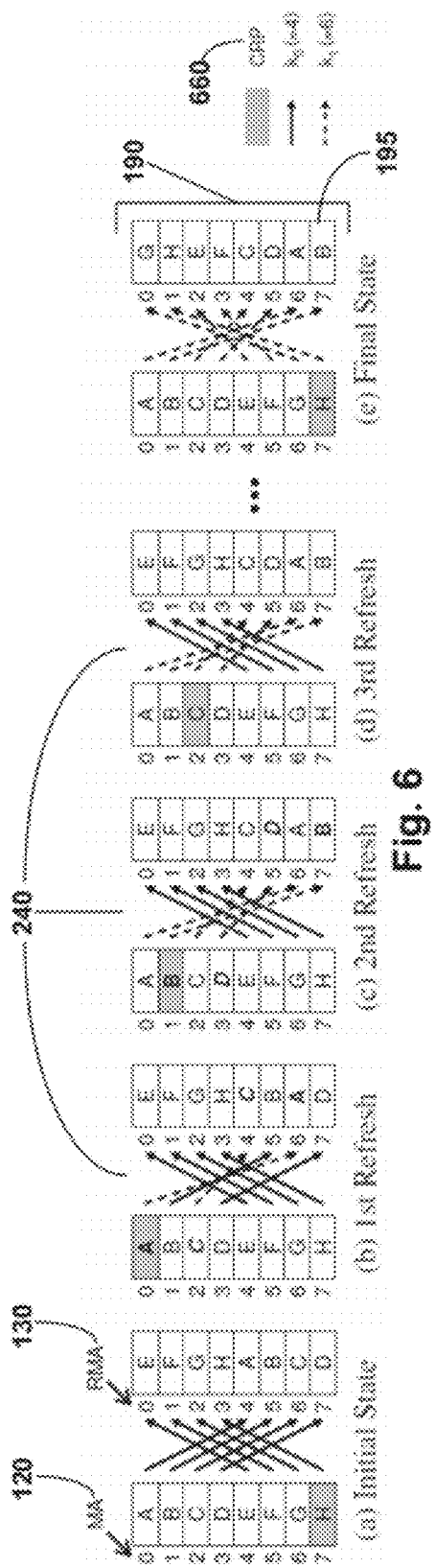
FIG. 6 illustrates a flow diagram of a security refresh round, according to an exemplary embodiment of the present invention.

FIG. 6 illustrates a flow diagram of a security refresh round 220 on a PCM region 190 comprising eight memory blocks 195, according to an exemplary embodiment of the present invention. As shown in FIG. 6, sub-figures (a) to (e) start from an initial state and illustrate successive security refreshes 240 for eight memory blocks 195 in the PCM region 190. In each sub-figure, the left column shows the MAs 120 (memory addresses) of these blocks with their data in capital letters, and the right column shows the RMAs 130 (refreshed memory addresses) and the actual data location in the PCM.

Sub-figure (a) shows the initial state in which all eight RMAs 130 were generated by XORing their corresponding MAs 120 with a random key $k_0$, where $k_0=4$. For example, the memory address MA0 (000) XOR $k_0$ (100) is mapped to RMA4 (100) in the physical PCM. Also note that, sub-figure (a) has reached the end of a security refresh round as all the MAs have been refreshed with $k_0$. Upon each security refresh, the candidate MA 120 to be refreshed can be pointed to by a register hereinafter called the current refresh pointer 660 (CRP), shown as a shaded box in the subfigures. The CRP 660 can be incremented 248 after each security refresh.

Sub-figure (b) illustrates the next security refresh 240. A new security refresh round 220 can be initiated because CRP 660 has reached the first MA 120 of a region 190. Consequently, a new random key ($k_1=6$) can be generated 210. In some embodiments a hardware random number generator 610 can generate random keys. In an exemplary embodiment, the hardware number generator can be embedded in SRC 180. At this point, MA0 is refreshed and remapped from RMA4 to RMA6. Since the data [A] of MA0 is now moved to RMA6 where the data [C] of MA2 used to be, [C] should be evicted from RMA4 and stored somewhere else. Due to the nature of XOR, MA2 will actually be mapped to RMA4 using the new key (2 XOR $k_1=4$), i.e., the RMA of MA0 from the previous round (0 XOR $k_0=4$). Thus, this security refresh essentially swaps data between the PCM locations corresponding to MA0 and MA2.

Security refresh using XOR can result in a swap of data between an MA to be refreshed and another MA that occupies the physical location that the MA to be refreshed should be remapped to in this current round. This property of XOR is hereinafter referred to as the pairwise remapping property, and holds true for functions that satisfy the associative property: $(x \oplus y) \oplus z = x \oplus (y \oplus z)$; the commutative property: $x \oplus y = y \oplus x$; and self-inverse property: $x \oplus x = e$, where e is an identity element such that $x \oplus e = x$. Although XOR is used in this example as an exemplary function satisfying the pairwise remapping property, it will be apparent to one skilled in the art that other functions can be used with the present invention.

In some embodiments, the SRC 180 is responsible for reading and writing the two memory blocks 195 to physically swap the data between them. In an exemplary embodiment, the SRC 180 comprises the necessary hardware to effect the swap.

Sub-figure (c) illustrates the next security refresh 240. Similar to last refresh, the data for MA1 and MA3 (the evictee of MA1) in PCM are swapped between RMA5 and RMA7.

Figure 4:
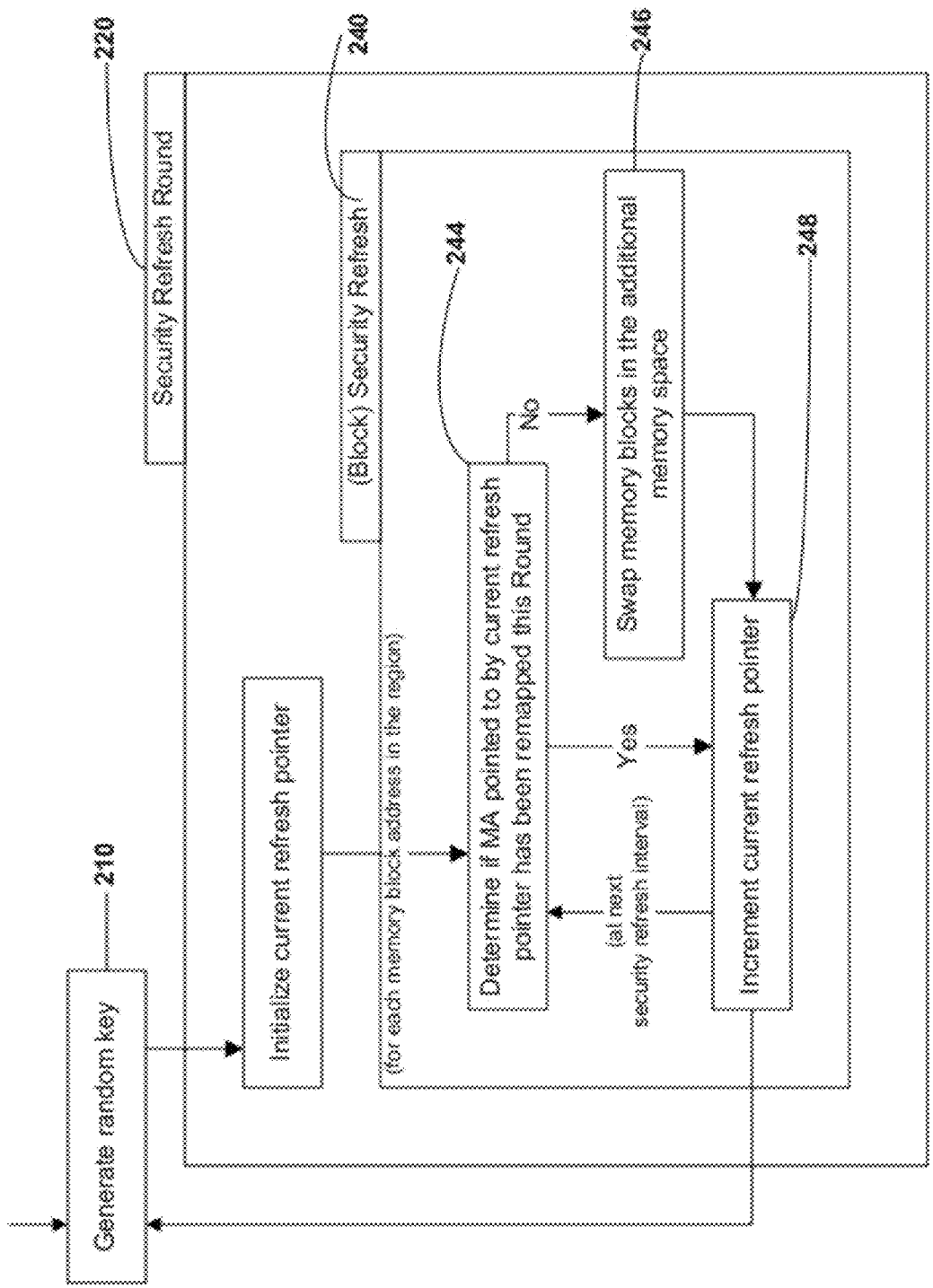
FIG. 4 illustrates a flow diagram of a round of Security Refresh, according to an exemplary embodiment of the present invention.

Sub-figure (d) illustrates the next security refresh 240. MA2, pointed to by the CRP 660, is the candidate for remapping. However, the data for MA2 has already been remapped previously in the current security refresh round 220 (see sub-figure (b)). In an exemplary embodiment, an MA 220 that has already been remapped in a particular refresh round 220 is not swapped again. As shown in the flow diagram of FIG. 4, if it is determined that an MA has already been remapped, remapping can be skipped and the CRP 660 can be incremented to point to a next memory block 195 in the region 190. Thus, MA2 is not swapped again, and the CRP 660 is incremented 248 to point to the next memory block 195.

An MA can be determined to have been already remapped in the current round by exploiting the pairwise remapping property. In an exemplary embodiment, a current candidate MA (the MA 120 pointed to by the CRP 660) can be XORed with the random key used in the prior refresh round and the random key used in the current refresh round 220. If the outcome is smaller than CRP 660, the memory block has already been remapped in the current round.

For example, in sub-FIG. 6(*d*), MA2 can be XORed with 4 (k0) and 6 (k1) giving a result of 0 (2 XOR 4 XOR 6=0). Since the result, 0, is smaller than CRP, 2, it indicates that MA2 has already been swapped in the particular refresh round 220.

Between sub-figures (d) and (e), the next five memory blocks 195 are refreshed in the same manner. After the eighth security refresh 240 in the current security refresh round 220, the CRP 660 will wrap around and reach MA0 again, completing the current security refresh round 220 (sub-figure (e)). Upon the next security refresh 220, a new random key, $k_2$, can be generated 210 and a new round starts using $k_1$ and $k_2$. $k_0$ will no longer be needed as for each refresh round 220, only the most recent two keys are needed.

III. Address Translation

To service a memory request for a given MA 120, the MA must be translated to its current RMA 130 using the right key in order to find the data location in PCM. In an exemplary embodiment, one bit can be added to an SRC 180 for each MA 120 in the region 190 serviced by the SRC to indicate whether the MA should be translated using the current random key or the key from the previous refresh round. Though one bit per block may seem small, a 1 GB PCM region with 16 KB memory blocks could require 8 KB ($2^{16}$ bits) of extra space. To provide fine-grained wear leveling with an exemplary block size of 256B, a 1 GB PCM region could require 512 KB ($2^{24}$) of extra space. Such hardware overhead for maintaining the translation information of each block is a main reason why the prior table-based approaches cannot support fine-granularity segments, i.e., small block sizes.

In an exemplary embodiment of the present invention, however, the pairwise remapping property and linearly increasing CRP 660 value property can be used to determine the right key without a table. Thus, Security Refresh enables fine-grained wear leveling of smaller memory blocks without overly burdensome hardware. In exemplary embodiments, a memory block size can be the cache line size of the last-level cache, or smaller. However, blocks smaller than the cache line size can require multiple PCM accesses to retrieve a single cache line.

When a memory controller 150 wants to read from or write to a given MA, $C_m$, the current key ($k_c$) can be used in the following two cases, otherwise, the key in previous refresh round ($k_p$) can be used:

(i) if $C_m$ is less than the value of CRP, the current key ($k_c$) can be used, since the given MA has already been refreshed in the current security refresh round; and (ii) if the $C_m \oplus k_p \oplus k_c$ is less than the value of the CRP, the current key can still be used.

The second condition detects whether $C_m$ was a victim that was evicted when another MA, $D_m$, was remapped to the old RMA value of $C_m$, i.e., $C_m \oplus k_p$. As explained, $D_m$ can be reconstructed by performing an XOR operation between the RMA value and the current key, which is $(C_m \oplus k_p) \oplus k_c$. If $D_m$ is compared against the CRP 660, it can be detected whether $C_m$ was a victim that is already remapped when $D_m$ was remapped.

IV. Security Refresh Hardware

FIGS. 7A-D illustrate schematic diagrams of hardware that can be used to implement Security Refresh, according to exemplary embodiments of the present invention. The main additional hardware for supporting Security Refresh can be the security refresh controller 180 (SRC), as shown in FIG. 7A. An SRC can comprise a specialized computing device.

In an exemplary embodiment, a PCM bank 170 can comprise one or more SRCs. Each SRC 180 can be associated with four registers, a random key generator 610 (RKG), address translation logic 620 (ATL) as shown in FIG. 7B, remapping checker 630 (RC) as shown in FIG. 7C, swapping logic 640 (SWL) as shown in FIG. 7D, and two swap buffers 642. The four registers can be: (1) KEY( ) register 670 to store a prior key; (2) KEY1 register 680 to store a current key; (3) a global write counter 650 (GWC) to count the total number of writes to a region for triggering security refresh, and (4) a current refresh pointer 660 (CRP) that points to the next MA 120 to be refreshed. In an exemplary embodiment, the KEY0 and/or KEY1 registers can be of size $\log_2 n$ bits, where n is the number of memory blocks in a region 190 corresponding to the SRC 180.

In various embodiments, one or more of these elements associated with an SRC may be embedded inside the SRC. In an exemplary embodiment, the SRC 180 can comprise the RKG 610. In a further embodiment, keys can be generated by the RKG in between two security refresh rounds using thermal noise generated by un-driven resistors in the SRC. Such random keys can never be accessed outside of or leave the PCM chip, thwarting prediction or detection by attackers. The ATL 750 can perform address translation. In an exemplary embodiment, the ATL can map an MA 120 from the memory controller to a corresponding RMA 130.

As explained earlier, some embodiments of the translation process need to determine whether a given MA has been remapped in the current round. This determination can be implemented in the RC 630, which can comprise two bitwise XOR gates, two comparators, and one OR gate. The RC 630 can also be responsible for finding an address to be remapped. In an exemplary embodiment, upon every security refresh, the RC 630 provides the same output to the SWL 640 so that SWL can decide whether the MA 120 should be remapped or not. If needed, the SWL 640 can perform a swap operation with the pair of swap buffers.

IV. Implementation Tradeoffs

As described above, Security Refresh presents several unique advantages over prior wear leveling techniques. However, there are various performance tradeoffs to be considered when implementing Security Refresh in a PCM design. For example, if the total number of writes required to start a new security refresh round is larger than the PCM write endurance limit, an adversary could wear a PCM block out before a new refresh round is triggered. On the other hand, extra PCM writes are induced for swapping two blocks upon remapping. Frequent swaps can unnecessarily increase the total number of PCM writes even for normal applications (write overhead), leading to performance degradation.

Moreover, a larger region distributes localized writes across a larger memory space; however, a large region requires a shorter refresh interval to increase the frequency of randomized mapping changes and progress through the refresh round. Otherwise, a lengthy refresh round can leave the randomized mapping unchanged for a protracted period, increasing the risk of side-channel attacks. On the other hand, a shorter refresh interval will inflict higher write overheads due to more frequent swapping, which can lead to a higher performance penalty. To address the issues of write overhead and performance penalty while still taking advantage of a large region size, the present invention enables a multi-level Security Refresh scheme.

IV. Multi-Level Security Refresh

Figure 8:
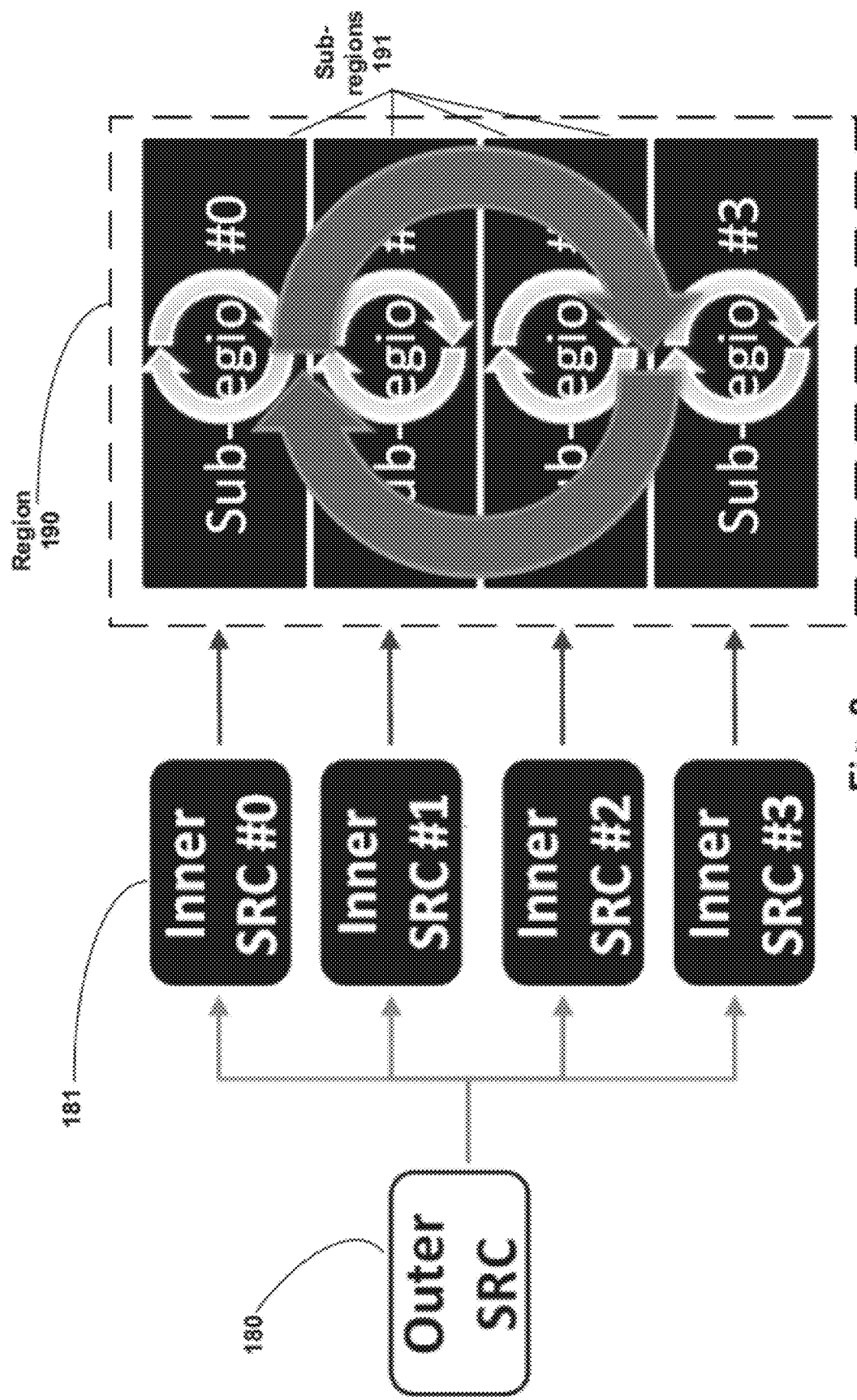
FIG. 8 illustrates a block diagram of a multi-level Security Refresh with two levels of dynamic remapping, according to an exemplary embodiment of the present invention.

FIG. 8 illustrates a block diagram of a multi-level Security Refresh with two levels of dynamic remapping, according to an exemplary embodiment of the present invention. In lieu of using small refresh intervals that can increase write overhead, a region 190 can be broken up into multiple smaller sub-regions 191, as shown in FIG. 8. Each sub-region can be associated with its own sub-region SRC 181 to perform address remapping based on an inner-level security refresh interval. In addition, an outer-level region SRC 180 can still distribute writes across the entire region 190 with its own refresh interval 250.

With a given refresh interval, a small sub-region can effectively trigger address remapping more frequently because of a smaller number of memory blocks within each sub-region. On the other hand, an outer-level SRC can occasionally remap an MA of a given memory block across sub-regions. The additional level can effectively enlarge a region size.

Each individual Security Refresh level can be regarded as an independent layer. In other words, each level can perform the Security Refresh algorithm with its own register values and settings, and the Security Refresh algorithm can guarantee the integrity of the address remapping. In some embodiments of the present invention, different regions and sub-regions can have different settings such as memory block sizes and refresh intervals, even for regions and sub-regions the same level.

In an exemplary embodiment, two levels of Security Refresh can provide dynamic remapping of memory blocks. However, it will be apparent to one skilled in the art that Security Refresh schemes can be implemented with more than two levels of security refresh.

Figure 9:
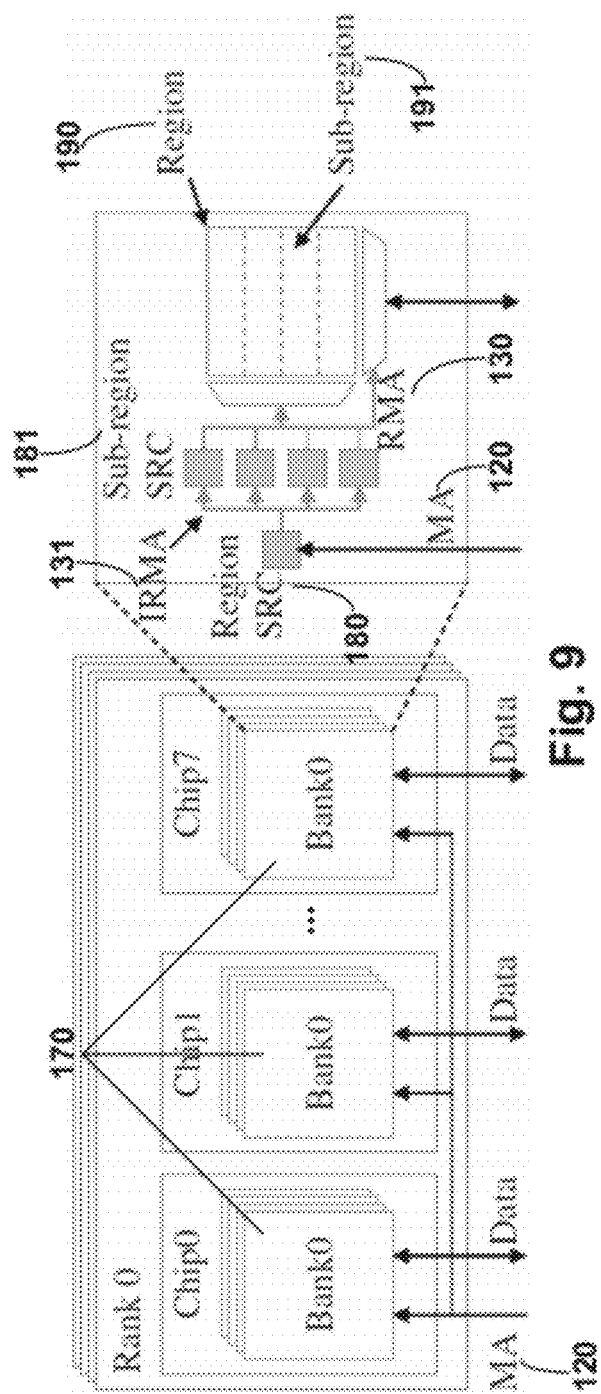
FIG. 9 illustrates a block diagram of a two-level Security Refresh embedded in a PCM bank, according to an exemplary embodiment of the present invention.

FIG. 9 illustrates a block diagram of a two-level Security Refresh scheme embedded in a PCM bank, according to an exemplary embodiment of the present invention. The two-level Security can work in a recursive fashion: An outer-level Security Refresh controller (i.e., region SRC 180) can accept a demand memory request from the memory controller 150 as its input. The region SRC 180 can remap a memory address 120 (MA) of the demand request to an intermediate remapped memory address 131 (IRMA). Meanwhile, if the demand request is a write that triggers a new refresh, the region SRC can perform the demand write request and then generate a swap operation that consists of two read requests and two write requests for two IRMAs 131. In this example, the region size of the outer-level Security Refresh is the size of a bank. Consequently, every $r_o$ writes to a given bank 150 (where $r_o$ is the security refresh interval of the outer level Security Refresh) can trigger a new refresh operation in the bank 150. In order to keep the integrity of its address remapping, the outer SRC can halt other requests until the swap is completed. The demand request or the swap requests generated by the outer SRC can be forwarded to the appropriate sub-regions according to a sub-region index field 155 in their IRMAs 131, as shown in FIG. 1B.

Each sub-region SRC 181 can perform the Security Refresh algorithm on its respective sub-region 191. The sub-region SRC 181 can take a request from the region SRC 180, which can be either a memory demand request or a swap request generated by the region SRC. The sub-region SRC 181 can use the IRMA 131 of those requests to find a corresponding RMA 130, which is the actual physical location of the data inside the sub-region 191.

If the request from the region SRC 180 triggers an inner-level, sub-region refresh, the sub-region SRC 181 can automatically perform a swap operation of two RMAs inside the sub-region. Consequently, every $r_i$ writes to a given sub-region (where $r_i$ is the security refresh interval of the inner-level sub-region Security Refresh) will trigger one new refresh operation in the sub-region.

In some embodiments, when the first write request of a swap operation from a region SRC 180 triggers a sub-region refresh, the second write request of the outer-level swap operation can be performed after the completion of the inner-level refresh to guarantee the integrity of the address remapping in the sub-region.

FIG. 1B illustrates an exemplary of address remapping from MA 120 to IRMA 131 through the outer-level Security Refresh and that from IRMA 131 to RMA 130 through the inner-level Security Refresh. In this exemplary illustration, each 1 GB bank is divided into 512 sub-regions while the memory block sizes for both region and sub-region are 32B. As shown in FIG. 1B, nine most significant bits from a row address are used as a sub-region index.

In other words, a row in this exemplary PCM bank is virtually partitioned into 512 sub-regions. For each sub-region, an inner-level SRC 181 can perform the operations of Security Refresh as explained above. Similarly, the region SRC 180 can perform the same operation across the entire bank 150.

In some embodiments the region SRC 180 can swap two memory blocks that belong to different sub-regions because the sub-region index is a part of output values of the XOR operation. Such swapping between distinct sub-regions triggered by the region SRC 180 enables distribution of localized writes across the entire bank 170 without using a large sub-region at the inner-level.

Figure 10:
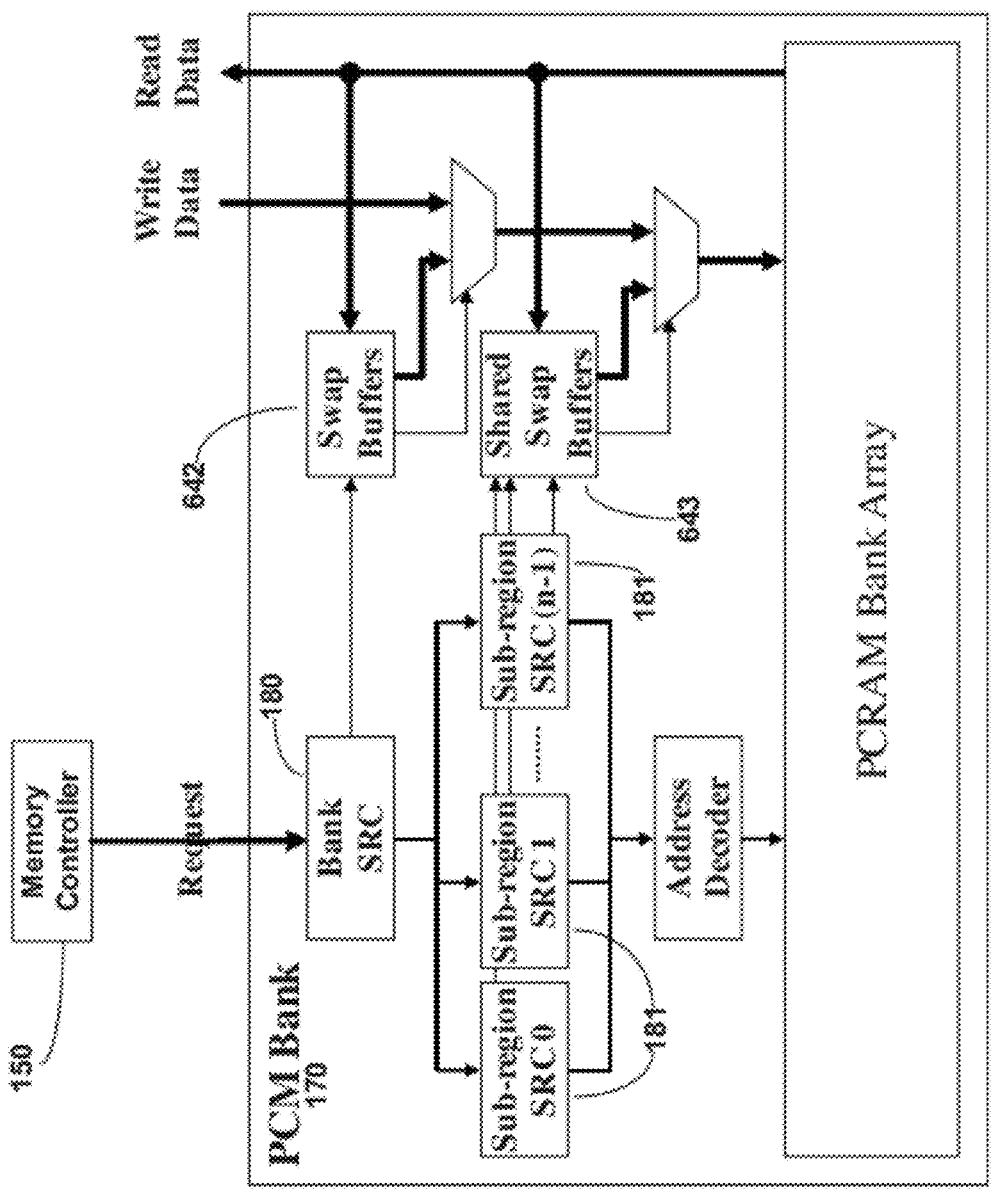
FIG. 10 illustrates a schematic diagram of a PCM bank of with two levels of Security Refresh, according to an exemplary embodiment of the present invention.

FIG. 10 illustrates a schematic diagram of a PCM bank of with two levels of Security Refresh, according to an exemplary embodiment of the present invention. Implementations of a multi-level Security Refresh scheme can share certain hardware within and between levels. For example, as shown in FIG. 10, in an exemplary embodiment, SRCs of the same level can share swap buffers 643. In another exemplary embodiment, a RKG 610 embedded in a PCM bank can be shared among one or more levels of SRCs. These examples are not exhaustive and it will be apparent to those skilled in the art that many other configurations reducing hardware requirements are possible.

V. Exemplary Computer Systems

Figure 11:
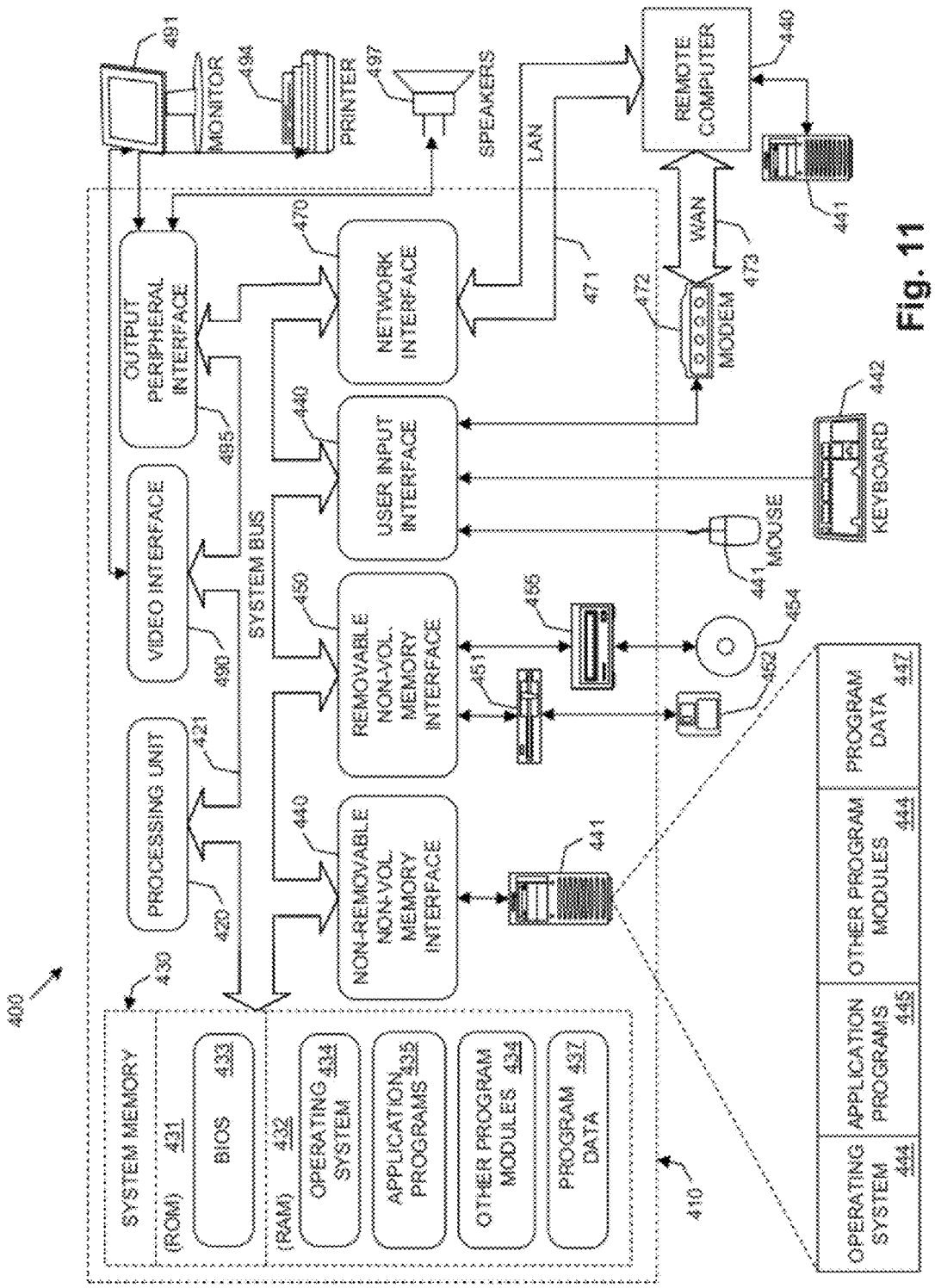
FIG. 11 illustrates an architecture of a suitable target platform or device that can use the dynamic remapping technique, according to an exemplary embodiment of the present invention.

FIG. 11 illustrates an architecture of a suitable target platform or device that can be used for implementation of the dynamic remapping method 300, according to an exemplary embodiment of the present invention. As mentioned above, one or more aspects of the dynamic remapping methods and related systems can be embodied, in whole or in part, in a computing device 400. FIG. 11 illustrates an example of a suitable computing device 400 that can be used.

Although specific components of a computing device 400 are illustrated in FIG. 11, the depiction of these components in lieu of others does not limit the scope of the invention. Rather, various types of computing devices 400 can be used to implement embodiments of the dynamic remapping method. Exemplary embodiments of the dynamic remapping method can be operational with numerous other general purpose or special purpose computing system environments or configurations.

Exemplary embodiments of the dynamic remapping method can be described in a general context of computer-executable instructions, such as one or more applications or program modules, stored on a computer-readable medium and executed by a computer processing unit. Generally, program modules can include routines, programs, objects, components, or data structures that perform particular tasks or implement particular abstract data types.

With reference to FIG. 11, components of the computing device 400 can comprise, without limitation, a processing unit 420 and a system memory 430. A system bus 421 can couple various system components including the system memory 430 to the processing unit 420.

The computing device 400 can include a variety of computer readable media. Computer-readable media can be any available media that can be accessed by the computing device 400, including both volatile and nonvolatile, removable and non-removable media. For example, and not limitation, computer-readable media can comprise computer storage media and communication media. Computer storage media can include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store data accessible by the computing device 400. For example, and not limitation, communication media can include wired media such as a wired network or direct-wired connection, and wireless media such as acoustic, RF, infrared and other wireless media. Combinations of any of the above can also be included within the scope of computer readable media.

The system memory 430 can comprise computer storage media in the form of volatile or nonvolatile memory such as read only memory (ROM) 431 and random access memory (RAM) 432. A basic input/output system 433 (BIOS), containing the basic routines that help to transfer information between elements within the computing device 400, such as during start-up, can typically be stored in the ROM 431. The RAM 432 typically contains data and/or program modules that are immediately accessible to and/or presently in operation by the processing unit 420. For example, and not limitation, FIG. 11 illustrates operating system 434, application programs 435, other program modules 436, and program data 437.

The computing device 400 can also include other removable or non-removable, volatile or nonvolatile computer storage media. By way of example only, FIG. 11 illustrates a hard disk drive 441 that can read from or write to non-removable, nonvolatile magnetic media, a magnetic disk drive 451 for reading or writing to a nonvolatile magnetic disk 452, and an optical disk drive 455 for reading or writing to a nonvolatile optical disk 456, such as a CD ROM or other optical media. Other computer storage media that can be used in the exemplary operating environment can include magnetic tape cassettes, flash memory cards, digital versatile disks, digital video tape, solid state RAM, solid state ROM, and the like. The hard disk drive 441 can be connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 11 can provide storage of computer readable instructions, data structures, program modules and other data for the computing device 400. For example, hard disk drive 441 is illustrated as storing an operating system 444, application programs 445, other program modules 446, and program data 447. These components can either be the same as or different from operating system 434, application programs 435, other program modules 436, and program data 437.

A web browser application program 435, or web client, can be stored on the hard disk drive 441 or other storage media. The web client 435 can request and render web pages, such as those written in Hypertext Markup Language, in another markup language, or in a scripting language.

A user of the computing device 400 can enter commands and information into the computing device 400 through input devices such as a keyboard 462 and pointing device 461, commonly referred to as a mouse, trackball, or touch pad. Other input devices (not shown) can include a microphone, joystick, game pad, satellite dish, scanner, electronic white board, or the like. These and other input devices are often connected to the processing unit 420 through a user input interface 460 coupled to the system bus 421, but can be connected by other interface and bus structures, such as a parallel port, game port, or a universal serial bus. A monitor 491 or other type of display device can also be connected to the system bus 421 via an interface, such as a video interface 490. In addition to the monitor, the computing device 400 can also include other peripheral output devices such as speakers 497 and a printer 496. These can be connected through an output peripheral interface 495.

The computing device 400 can operate in a networked environment, being in communication with one or more remote computers 480 over a network. The remote computer 480 can be a personal computer, a server, a router, a network PC, a peer device, or other common network node, and can include many or all of the elements described above relative to the computing device 400, including a memory storage device 481.

When used in a LAN networking environment, the computing device 400 can be connected to the LAN 471 through a network interface or adapter 470. When used in a WAN networking environment, the computing device 400 can include a modem 472 or other means for establishing communications over the WAN 473, such as the internet. The modem 472, which can be internal or external, can be connected to the system bus 421 via the user input interface 460 or other appropriate mechanism. In a networked environment, program modules depicted relative to the computing device 400 can be stored in the remote memory storage device. For example, and not limitation, FIG. 11 illustrates remote application programs 485 as residing on memory storage device 481. It will be appreciated that the network connections shown are exemplary and other means of establishing a communications link between computers can be used.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

We claim:

1. A computer program product embodied in a non-transitory computer-readable medium, the computer program product comprising an algorithm adapted to effectuate a method for dynamically remapping a set of elements onto another set of elements, the method comprising:
   providing a first set of elements bijectively mapped onto a second set of elements;
   providing a pointer for indicating an element from the first set; and
   dynamically remapping the first set onto the second set, wherein the dynamically remapping comprises performing two or more rounds of mapping, each respective round of mapping comprising:
   mapping, at least partially based on a random key, each respective element of the first set to a random respective element in the second set by swapping, between the respective element from the first set and another respective element from the first set, their respective mappings to an element from the second set, wherein the random key is a new random key provided for the respective round of mapping and wherein the pointer is updated to indicate an element from the first set to be mapped next during the respective round of mapping; and
   tracking, using the pointer, the new random key for the respective round of mapping, and a random key from a previous round of mapping, which elements from the first set have already been mapped to elements from the second set in the respective round of mapping.

2. The computer program product of claim 1, further comprising providing a set of sub-elements, each respective sub-element of the set of sub-elements corresponding to a respective element from the first set of elements and mutably associated with a respective element from the second set of elements;
   wherein the swapping, between the respective element from the first set and another respective element from the first set, their respective mappings to an element from the second set, comprises swapping, between the sub-element corresponding to the respective element from the first set and the sub-element corresponding to the another respective element from the first set, their respective associations to an element from the second set.

3. The computer program product of claim 2, wherein the first set and the second set comprise a first region of memory address space and a second region of memory address space, respectively, wherein each respective element of the first set and of the second set comprises a memory block, and wherein each respective sub-element of the set of sub-elements comprises data.

4. The computer program product of claim 1, wherein the mapping of each respective element of the first set to a random respective element from the second set is based on a predetermined interval.

5. The computer program product of claim 4 further comprising receiving one or more requests for an element from the first set, wherein the predetermined interval is at least partially based on a predetermined number of requests for an element from the first set.

6. The method of claim 1, wherein the mapping at least partially based on the random key, each respective element of the first set to a random respective element in the second set, comprises, selecting the random respective element at least partially based on performing an algebraic operation on an index of an element of the first set to derive an index of the random respective element.

7. The method of claim 6, wherein the algebraic operation satisfies associative, commutative, and self-inverse properties.

8. The method of claim 6, wherein the algebraic operation is an XOR operation.

9. A computer-implemented method for dynamically remapping a memory address space to another memory address space comprising:
   providing a first region of memory address space comprising a plurality of memory blocks and providing a second region of memory address space comprising a plurality of memory blocks, wherein the second region and the first region have a same size and there is a one-to-one mapping between memory blocks of the first region and second region;

providing a pointer for pointing to a memory block from the first region; and dynamically remapping the first region onto the second region, wherein the dynamically remapping comprises performing two or more rounds of mapping, each respective round of mapping comprising:

mapping, at least partially based on a random key, each respective memory block of the first region to a random respective memory block from the second region, by swapping, between the respective memory block from the first region and another respective memory block from the first region, their respective mappings to a memory block from the second region, wherein the random key is a new random key provided for the respective round of mapping and wherein the pointer is updated to indicate a memory block from the first region to be mapped next during the respective round of mapping; and tracking using the pointer, the new random key for the respective round of mapping, and a random key from a previous round of mapping, which memory blocks from the first region have already been mapped to memory blocks from the second region in the respective round of mapping.

10. The computer-implemented method of claim 9 further comprising receiving one or more write requests to the first region of memory address space, and wherein mapping a respective memory block of the first region to a respective memory block from the second region occurs responsive to a predetermined number of write requests to the first region of memory address space.

11. The computer-implemented method of claim 9, wherein the mapping at least partially based on the random key comprises mapping at least partially based on an algebraic operation on a block address of a memory block from the first region with the random key, the algebraic operation satisfying the associative, commutative, and self-inverse properties.

12. The computer-implemented method of claim 11, wherein the algebraic operation is an XOR operation.

13. The method of claim 9, wherein the swapping, between the respective memory block from the first region and another respective memory block from the first region, their respective mappings to a memory block from the second region, comprises swapping, for the respective memory block from the first region and the another respective memory block from the first region, the memory blocks from the second region that their corresponding data are stored in.

14. A system for dynamically remapping a set of elements onto another set of elements comprising:
a first set of elements;
a second set of elements;
a random key provider;
a pointer for indicating an element from the first set; and
a controller configured to dynamically remap the first set onto the second set, wherein the dynamically remapping comprises performing two or more rounds of mapping, each respective round of mapping comprising:
providing, by the random key provider, a new random key for the respective round of mapping;
mapping, at least partially based on the new random key, each respective element of the first set to a respective element in the second set, set by swapping, between the respective element from the first set and another respective element from the first set, their respective mappings to an element from the second set, wherein the pointer is updated to indicate an element from the first set to be mapped next during the respective round of mapping; and tracking, using the pointer, the new random key for the respective round of mapping, and a random key from a previous round of mapping, which elements from the first set have already been mapped to elements from the second set in the respective round of mapping.

15. The system of claim 14, wherein the first set of elements and the second set of elements comprise a first region of memory address space and a second region of memory address space, respectively, and wherein each respective element from the first set and the second set comprises a memory block.

16. The system of claim 15, wherein the random key provider is a random key generator, and the controller comprises:
a register configured to store a first random key; and
a register configured to store a second random key.

17. The system of claim 15 further comprising a non-volatile memory bank, the non-volatile memory bank comprising a plurality of the controllers.

18. The system of claim 14, the controller further comprising:
a register configured to store the pointer.

19. The system of claim 15, wherein a size of each memory block is a cache line size of a last-level cache.

20. The system of claim 16, wherein the random key generator is configured to generate random keys based at least partially on thermal noise from the controller, the controller further comprising the random key generator.

21. The system of claim 16, wherein the mapping at least partially based on the new random key comprises mapping based on an algebraic operation on a block address of a memory block of the first region with the new random key, the algebraic operation satisfying the associative, commutative, and self-inverse properties;
the system further comprising two swap buffers for storing data; and
the controller further comprising a swapping logic configured to swap data between memory blocks from the second region using at least the two swap buffers.

22. The system of claim 16, wherein:
the controller is further configured to receive write requests for memory blocks of the first region and comprises a register configured to store a count of write requests; and
wherein a predetermined interval for initiating mapping of an element from the first set to a respective element from the second set is at least partially based on a predetermined number of write requests for a memory block in the first region.

23. The system of claim 16, the controller further comprising address translation logic configured to translate the address of a given memory address in the first region of memory address space to an address of a memory block in the second region based on the pointer, a random key for a current respective round of mapping, and a random key from a previous respective round of mapping.

* * * * *